Aug. 1, 1939.  C. B. SMITH ET AL  2,167,782
INDICATOR FOR DEFLATED PNEUMATIC TIRES
Filed July 17, 1935  2 Sheets-Sheet 1
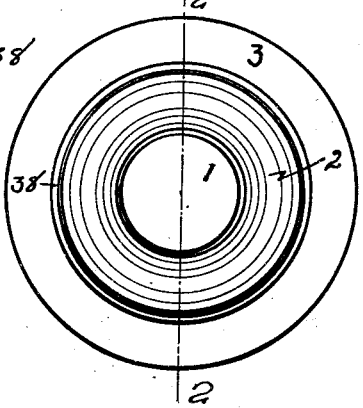
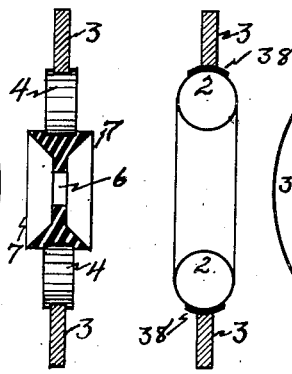
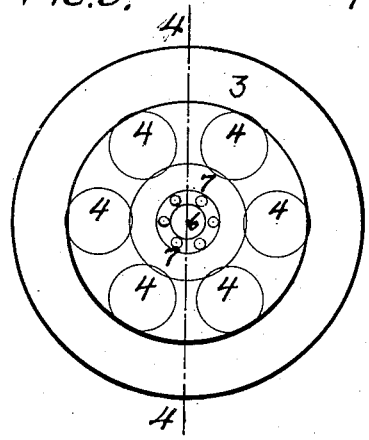
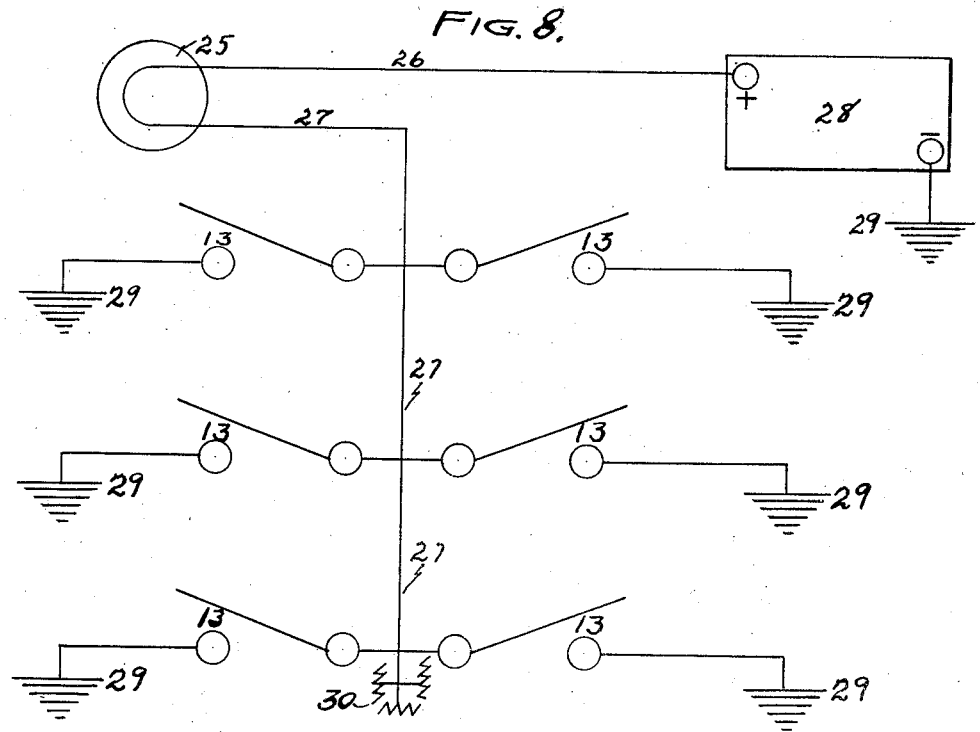
WITNESSES:
Peter C. Norton
St. L. Willis
INVENTORS.
Charles Byron Smith.
Corwin Satterthwaite Harvey.

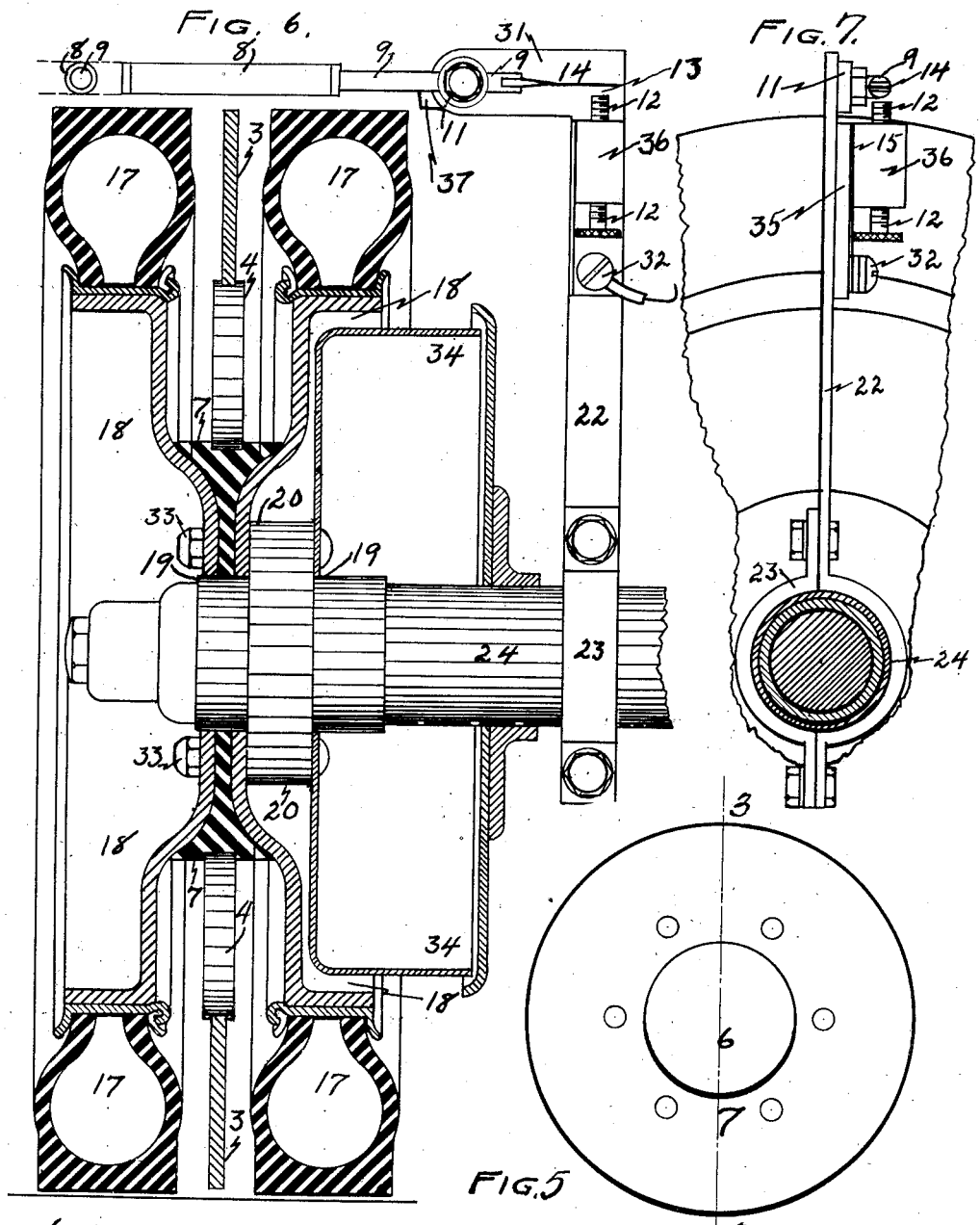

Patented Aug. 1, 1939

2,167,782

UNITED STATES PATENT OFFICE 2,167,782

INDICATOR FOR DEFLATED PNEUMATIC TIRES

Charles Byron Smith, Tucson, Ariz., and Corwin Satterthwaite Harvey, Milwaukie, Oreg.

Application July 17, 1935, Serial No. 31,840

4 Claims. (Cl. 200—58)

Our invention has particular application to motor buses, trucks, and tractors, operated singly, or in combination with other vehicles, such as semi-trailers, full-trailers, and the like, in all cases wherein said vehicles have wheels, some, or all of which are equipped with two or more pneumatic tires. Such wheels are commonly known as "dual-tired" wheels, and will be so called herein; all references being to pneumatic tires.

Dual-tired wheels are subject to the fault that in cases wherein the vehicle which they support is heavily laden, and one tire of a pair of dual tires on any wheel deflates, the overload thereby imposed on the other, inflated, tire of that pair, unless immediately discovered and relieved, will, within a short distance, cause it to blow out. At high speeds and in hot weather, this liability is greatly increased. This usually results in complete ruin of both tires on that wheel, and is both expensive and hazardous.

At this time there is not in use or available any reliable device or mechanism for warning and/or signalling the operator of a tractor, motor-bus, motor-truck, or other motor vehicle, that one or more tires on the vehicle he is operating, or on semi-trailers, or full-trailers, drawn by it, has or have deflated. The purpose of our invention is to provide and render available simple, effective, reliable, positive full-automatic mechanism for warning the operator that deflation of tires has occurred.

Our invention is based on the proposition that any axle, forming part of any vehicle intended to move, or to be moved, over the surface of the ground, and supported at any distance above the ground solely by wheels equipped with pairs of dual pneumatic tires, must approach closer to the ground when one or both of the tires on any of the wheels supporting it deflate; and if the vehicle is loaded, the decrease in distance between the axle and the ground is sufficient to operate a switch in an electric circuit forming a part of the indicating mechanism incorporated in our invention and located in the cab of the propelling vehicle, thereby accomplishing the intended purpose.

We attain the object of our invention by mechanism illustrated in the accompanying drawings, in which similar numerals refer to similar parts throughout the several views.

Fig. 1 is a side elevation of one form of the actuating mechanism of our invention, consisting substantially of a circular, revolvable, road-surface contacting element comprising a rigid actuating disc 3 having an opening passing through it centrally from side to side, a rigid, circular rim 38 of curved cross-section disposed in said opening and engaging with the surrounding edge thereof, and a circular, hollow, tubular, elastic ring 2 inflated with an elastic fluid, and disposed inwardly concentric to rim 38 and engaging therewith.

Fig. 2 is a vertical cross-section of Fig. 1, taken on the line 2—2 of Fig. 1.

Fig. 3 is a side elevation of an alternative form of the actuating mechanism, consisting substantially of actuating disc 3 having an opening passing centrally through it from side to side, and spring means 4—4, etc., disposed in said opening and engaging with the surrounding edge thereof, and a flexible cushioning element 7 having an opening 6 passing centrally through it from side to side, and disposed inwardly concentric to said disc and said spring means, and engaging with the latter.

Fig. 4 is a vertical cross-section of Fig. 3, taken on the line 4—4 of Fig. 3.

Fig. 5 is a side elevation of cushioning element 7 drawn to a larger scale, showing the central opening 6, and the holes for the hub-bolts 33, shown in Fig. 6.

Fig. 6 is a vertical cross-section through the center of a pair of typical compound wheels 18—18, fitted with dual tires 17—17. The wheel units are demountably held in place by hub-bolts 33—33, against shoulder 20 of wheel-hub 19, which revolves about the center of axle 24. Shoulder 20, wheel hub 19, and axle 24, are not shown in section.

Fig. 7 is a fragmentary side-view of the upper portion of the parts shown in Fig. 6. The view is outward from a position between wheel units 18—18 and the vehicle. The latter is not shown, but axle 24 is assumed to be a part of it.

Fig. 8 is a diagrammatic view of the electric system used with our invention. Battery 28 is connected to lamp-globe 25 through wire 26; wire 27 carries the current onward to the plurality of switch-gaps 13—13, etc.; symbols 29—29, etc., indicate where the negative wires are grounded to the frame of the vehicle.

Fig. 5 is a side view of a moulded element of flexible, though not necessarily elastic, material. It is circular in shape, has a central, round opening, 6, passing completely through it from side to side. The opening adapts it to be passed over the outer end of wheel-hub 19. Smaller round holes have their centers located on a circle concentric to, and greater in diameter than, opening 6. These smaller holes correspond in size, number and relative location, to the size, number and relative location of hub-bolts 33—33, shown in Fig. 6. A side-elevation of part 7, and also of parts 3 and 4—4—4—4—4—4, all in their relative positions with respect to each other, is shown in Fig. 3; and in cross-section on the line 4—4, in Fig. 4. Fig. 3 and Fig. 4 are drawn to reduced scale. In Fig. 6, parts 3, 4—4—4—4—4—4, and 7, also show in cross-section, in their relative position with respect to tires 17—17, wheels 18—18, and hub 19, and the other parts of our invention illustrated and numbered therein.

Part 3 is a rigid, circular disc, of steel or other suitable material. Its overall diameter is approximately the same as the greatest diameter of tires 17—17, when properly inflated and supporting their maximum load.

Parts 4—4—4—4—4—4 are circular springs in the form of rings of thin, flat spring material, such as spring steel, and all are as nearly as possible alike in size, and modulus of elasticity.

Disc 3 and springs 4—4—4—4—4—4 are combined, relative to each other, into a single unit, as illustrated in Fig. 5, and are fastened together by spot-welding, or other means.

Directly opposite the respective points where circular springs 4—4—4—4—4—4 are joined to the inner periphery of disc 3, the peripheries of springs 4—4—4—4—4—4 engage with a groove provided in the outer periphery of part 7, as shown in the side-elevation in Fig. 3, and in cross-section in Fig. 4 and Fig. 6.

In Fig. 1 and Fig. 2, disc 3 is shown in combination with a curved rim, 38, which is attached to its inner periphery. Mounted inside rim 38 is a hollow, round ring of tough, elastic rubber, 2, with a round central opening, 1, passing through its center, from side to side. Fig. 1 is a side-elevation of disc 3, rim 38, and hollow ring 2. Fig. 2 is a cross-section view, taken on the line 2—2, of the parts shown in Fig. 1, with rim 38 more clearly indicated.

Motor vehicles, and vehicles drawn by them, differ in many details of their designs. In cases where the design of the wheels, axles, dual-tires, springs, brake-drums, and other details, will not allow, in a deflated tire indicator, the use of disc 3 in such a combination of parts as illustrated in Fig. 3, Fig. 4, and Fig. 6, the combination of parts shown in Fig. 1 and Fig. 2 may be substituted therefor. Hollow rubber ring 2 is inflated to a suitable pressure with compressed air, in a manner similar to the inner tube of a pneumatic tire, and in such cases takes the place of part 7 and circular springs 4—4—4—4—4—4, and attains the same objects.

These objects are to hold disc 3 in position between tires 17—17, and flexibly centered about wheel-hub 19 in such a manner that the center of disc 3 coincides with the center of axle 24; and at the same time, to provide an elastic medium between wheel-hub 19 and disc 3, adapted to yield under the application of force and allow relative movement in a vertical plane between disc 3 and the outer periphery of wheel-hub 19, within limits fixed by the difference in the diameters of wheel-hub 19 and the round opening passing through the center of disc 3, from side to side; less the fixed space occupied by the solid portions of part 4—4—4—4—4—4 and 7, or parts 2 and 38.

Relative movement in a vertical plane, between disc 3 and wheel-hub 19, as will be further explained, accomplishes the object in our invention of closing gap 13, between flexible contact-strip 14 and screw 12, Fig. 6, thereby completing an electric circuit which causes lamp 25 to glow.

In addition, relative movement between disc 3 and wheel-hub 19 in a vertical plane adapts disc 3 readily to adjust itself to irregularities in the road-surface, and to yield under shocks caused by impact with objects run over by the wheels, thus avoiding distortion of its shape, which might otherwise occur. At the same time, the liability of damage to disc 3 is further decreased by installing it between wheel-units 18—18, and providing for a limited side movement between them.

The fact that the contour of the walls of hollow rubber ring 2, when inflated to the proper pressure, can conform to the contour of the space between dual tires 17—17, the tire-rims, and the two units of the compound wheel 18—18, makes the use of part 7 unnecessary in combination with rubber ring 2.

Fig. 8 illustrates diagrammatically a typical system of electric circuits with connections for six wheels. The system can be expanded or contracted to provide more or less than six connections. With this system of electric circuits, only one lamp, 25, is used. It is red in color and is located in the cab of the propelling vehicle. The closing of any gap 13 at any wheel causes lamp 25 to glow red, indicating to the operator that a tire has deflated. But without more information, he will not know which tire has deflated, of all the tires on the vehicle, or vehicles, he is operating. A separate lamp for each wheel having dual tires can be provided, the connections be separated into individual circuits; and the particular wheel upon which a tire has deflated will be indicated.

Referring to Fig. 6 and Fig. 7, part 22 is a vertical standard, adjustable as to length (or height) held to axle 24 by clamp 23. At the upper end of standard 22, and a part of it, is the projecting arm 31, which supports the pivot-joint 11. Mounted on the side of standard 22, near its upper end, and electrically insulated from it by insulation strip 35, is part 36, having a threaded hole through which passes contact adjusting screw 12. Part 32 is a binding-post shown in electrical connection through conductor 15 with part 36 and contact screw 12. Binding-post 32 can also be attached directly to part 36. Binding-post 32 is connected by suitable wiring to conductor 27, Fig. 7. The open gaps 13—13—13—13—13—13, shown in Fig. 8, are the gaps between contact-screws 12 and the flexible contact-strips 14, as shown in Fig. 6 and Fig. 7. Contact-strips 14 are electrically grounded to the frame of the vehicle. Closing gap 13 at any wheel completes a circuit beginning at the positive pole of battery 28, Fig. 8, passing through conductor 26 to lamp 25, thence through conductor 27 to binding-post 32, Fig. 6, thence to screw 12, to contact-strip 14, which is grounded to the frame of the vehicle; thence through the vehicle frame to the negative pole of battery 28, which pole is also electrically grounded to the frame of the vehicle. In Fig. 8, numerals 29—29—29—29—29—29—29, indicate grounds to the vehicle frame.

The details of the design of the parts of our invention heretofore, or hereafter referred to, such as their shapes, sizes, and their points of attachment to the vehicle upon which the invention is installed, must vary according to the requirements of the design of the vehicle, but this does not change their functions or the principles upon which they operate.

Part 9 is a member, adjustable as to its length, between pivot-joint 11, and its left-hand extremity as viewed in Fig. 6. Part 9 projects outward from pivot-joint 11 to a point directly above and close to the outer peripheries of dual tires 17—17, in line with, and directly above, the center of axle 24. Part 8 is a sleeve or roller mounted on the end of part 9, upon which it freely revolves. Parts 8 and 9 are free to assume a horizontal position and are held to that position by their own weight. A stop, 37, prevents their dropping below a horizontal position. Part 9, carrying the attached flexible contact-strip 14, is pivotally attached to arm 31 by pivot-joint 11, as illustrated, and is free, within certain limits, to move as follows: in a vertical plane passing through the center of axle 24, with pivot-joint 11 as the center of revolution, the ends can describe arcs of circles. The left-hand end, as illustrated in Fig. 6, carrying roller 8, is free to rise from the horizontal position shown, thereby depressing the right-hand, or opposite end, to which is fastened flexible contact-strip 14, thus bringing the latter into contact with screw 12, completing the electric circuit which causes lamp 25 to glow.

With both tires 17—17 fully inflated, and each tire supporting its proportionate share of the weight of the vehicle apportioned to compound wheel 18—18, the center of disc 3 conicides with the center of axle 24, flexibly held in that position by springs 4—4—4—4—4—4, assisted by part 7, or by the inflated hollow rubber ring 2, shown in Fig. 1 and Fig. 2. In either case disc 3 occupies the position shown in Fig. 6, with respect to roller 8 or part 9.

Assume, now, that either of tires 17—17 deflate, the effect is to double the load on the other tire. Any pneumatic tire, mounted on a wheel supporting one end of the axle of a vehicle, and inflated to an air pressure sufficient, but not in excess of that required, to support and maintain that end of the axle a given distance above the surface of the road, must flatten out or sag, if the weight borne by it be greatly increased, or doubled, and the air pressure within said tire be not increased; the end of the axle must move closer to the ground. Deflation of one of the tires 17—17, with the other tire remaining inflated, doubles the load on the inflated tire. The air pressure within the inflated tire is not increased. Therefore, in strict accordance with the natural law above stated, axle 24, and all of its attached parts, move downward. Disc 3, being rigid, and already in contact with the ground, cannot move downward. The elastic medium separating disc of wheel-hub 19, axle 24, wheels 18—18, and tires 17—17, occurs with respect to disc 3. The relative change of position of these parts with respect to disc 3 causes disc 3 to become eccentric to tires 3 from wheel-hub 19 yields under the weight of the vehicle, and relative motion in a vertical plane 17—17, with the point of maximum eccentricity being directly opposite the point of contact of tires 17—17 and disc 3 with the road surface. This motion brings the upper part of the outer rim of disc 3 into contact with roller 8, and as the motion continues, roller 8, and the two ends of part 9, describe, in a vertical plane passing through the center of axle 24, arcs of circles, the centers of which are pivot-joint 11. This movement of part 9, closes gap 13, and brings flexible contact-strip 14 into electrical contact with screw 12, thus completing the electric circuit which causes lamp 25 to glow. This motion of part 9 is independent of, and not effected by, the revolution or non-revolution of the wheels of the vehicle, or the fact that disc 3 revolves as they revolve. The fact that the outer end of part 9 may come in contact with the outer rim of disc 3 while the latter is rapidly revolving, is the reason for providing a revolvable roller, part 8, at one end of part 9.

A suitable cover, not illustrated, of light metal is provided for pivot-joint 11, flexible contact-strip 14, and the other parts of the electrical apparatus mounted on the upper end of standard 22 and arm 31.

The sides and the outer rim of disc 3 are smooth, so as to minimize the liability of rocks and other hard objects lodging in the space between disc 3 and the sides of tires 17—17. We consider this a valuable feature of our invention.

In some types of compound wheel designs, equipped with dual tires, it might be advisable to mount disc 3 in combination with springs 4—4—4—4—4—4, or rubber ring 2, on that part of the brake-drum 34 which projects inward toward the vehicle beyond the inner vertical boundary line of tires 17—17. This could readily be done by slight alterations in the details of construction of the parts comprising our invention. In general, however, this would not be as satisfactory as the method illustrated and described herein, owing to the greater difficulty in protecting the parts from damage occurring in use.

Referring to part 22, and to part 9, Fig. 6, and Fig. 7, they have been described as "adjustable". In the case of standard 22, the reason for this is that the distance between axle 24 and pivot-joint 11, which is supported by arm 31, is determined by the diameter of the wheels and the size of tires used with them. This distance will vary with different vehicles. When the proper distance for any vehicle has been ascertained, the length (or height) of standard 22 is adjusted to accord with and maintain this distance, and standard 22 is then clamped permanently to the axle. This adjustment will not again be changed on that vehicle, except where changes in wheel diameters and tire sizes necessitate it.

In the case of part 9, its length between pivot-joint 11 and roller 8 depends on the size of the tires, and also upon the location of clamp 23 on axle 24, which is determined by the position of the springs of the vehicle, the clamps which hold them to the axles, the brake-rods and levers, and other factors.

The object is to simplify the problem of installation of our invention on vehicles of different types, sizes, and designs.

The principles upon which our invention is based, require that pivot-joint 11 be rigidly attached to and supported by axle 24, and move upward and downward with respect to the road or ground level, as axle 24 moves vertically in either direction. There can be no relative vertical movement either upward or downward of pivot-joint 11 or axle 24 with respect to each other. Therefore, it is not possible in our invention for pivot-joint 11 to be attached to and supported by any other part of the vehicle than axle 24. The interposition of spring-action between pivot-joint 11 and axle 24 would interfere with and might entirely prevent the operation of the invention.

Having disclosed one form of our invention by illustrating and describing it, without confining ourselves thereto, we claim:

1. An automatic electric indicator for deflated pneumatic tires comprising a structure embodying an electric circuit-closing device of the class described, and an actuating mechanism in co-acting and operative relation therewith; said circuit-closing device consisting substantially of a vertical standard having a supporting clamp at its bottom engaging with a vehicle axle, and at its top a horizontal extension provided with a fulcrum and a lever-arm pivotally mounted thereon and movable in a vertical plane, said lever-arm having a revolvable roller sleeve on one end and at the other end a flexible contact strip forming a part of an electric circuit; said circuit-closing device consisting furthermore of an adjustable contact screw having means for its connection into said electric circuit, said screw mounted on and electrically insulating from said standard, said flexible contact strip normally held out of engagement with said contact screw, but adapted to engagement therewith; and said actuating mechanism consisting substantially of a circular, revolvable, road-surface contacting element comprising a rigid actuating disc having an opening passing centrally through it from side to side, and spring means disposed in said opening and engaging with the surrounding edge thereof and forming a portion of said element; and furthermore consisting of a flexible cushioning element disposed in surrounding concentric and engaging relation with the hub of a dual vehicle-wheel revolvably disposed on said vehicle axle and having a plurality of wheel-discs and tire-rims with pneumatic tires disposed thereon; said cushioning element furthermore disposed between and conforming to the contour of said wheel-discs; and said actuating disc and spring means disposed in surrounding, concentric, flexible, elastic relation with said cushioning element, the said spring means engaging therewith; said actuating disc normally held, by said spring means, in a position concentric to said wheel hub and cushioning element and out of actuating engagement with the revolvable roller sleeve of said circuit-closing device, but movable from said concentric position, upon the application of a predetermined force to its periphery, to a position eccentric to said wheel hub and cushioning element and into actuating engagement with said revolvable roller sleeve of said circuit-closing device.

2. The structure embodying an electric circuit-closing device of the class described, and an actuating mechanism in co-acting and operative relation therewith; said circuit-closing device consisting substantially of a vertical standard having a supporting clamp at its bottom engaging with a vehicle axle, and at its top a horizontal extension provided with a fulcrum and a lever-arm pivotally mounted thereon and movable in a vertical plane, said lever-arm having a revolvable roller sleeve on one end and at the other end a flexible contact strip forming a part of an electric circuit; said circuit-closing device consisting furthermore of an adjustable contact screw having means for its connection into said electric circuit, said screw mounted on and electrically insulated from said standard, said flexible contact strip normally held out of engagement with said contact screw, but adapted to engagement therewith; and said actuating mechanism consisting substantially of a circular, revolvable, road-surface contacting element comprising a rigid actuating disc having an opening passing centrally through it from side to side, and spring means disposed in said opening and engaging with the surrounding edge thereof and forming a portion of said element; and furthermore consisting of a flexible cushioning element disposed in surrounding concentric and engaging relation with the hub of a dual vehicle-wheel revolvably disposed on said vehicle axle and having a plurality of wheel discs and tire rims with pneumatic tires disposed thereon; said cushioning element furthermore disposed between and conforming to the contour of said wheel discs; and said actuating disc and spring means disposed in surrounding, concentric, flexible, elastic relation with said cushioning element, the said spring means engaging therewith; said actuating disc normally held, by said spring means, in a position concentric to said wheel hub and cushioning element and out of actuating engagement with the revolvable roller sleeve of said circuit-closing device, but movable from said concentric position, upon the application of a predetermined force to its periphery, to a position eccentric to said wheel hub and cushioning element and into actuating engagement with said revolvable roller sleeve of said circuit-closing device.

3. An automatic electric indicator for deflated pneumatic tires comprising a structure embodying an electric circuit-closing device of the class described, and an actuating mechanism in co-acting and operative relation therewith; said circuit-closing device consisting substantially of a vertical standard having a supporting clamp at its bottom engaging with a vehicle axle, and at its top a horizontal extension provided with a fulcrum and a lever-arm pivotally mounted thereon and movable in a vertical plane, said lever-arm having a revolvable roller sleeve on one end and at its other end a flexible contact strip forming a part of an electric circuit; said circuit-closing device consisting furthermore of an adjustable contact screw having means for its connection into said electric circuit, said screw mounted on and electrically insulated from said standard, said flexible contact strip normally held out of engagement with said contact screw, but adapted to engagement therewith; and said actuating mechanism consisting substantially of a circular, revolvable, road-surface contacting element comprising a rigid actuating disc having an opening passing centrally through it from side to side, a rigid, circular rim of curved cross-section disposed in said opening and engaging with the surrounding edge thereof, and a circular, hollow, tubular, flexible, elastic ring inflated with an elastic fluid, and disposed inwardly concentric to said rim and in engagement therewith; said actuating mechanism disposed between dual pneumatic tires, tire-rims and wheel-discs of a dual vehicle-wheel mounted upon said vehicle axle and revolving with said wheel; and furthermore disposed in surrounding, concentric, flexible, elastic relation with the hub of said wheel, the said tubular ring engaging therewith, and with the inner surfaces of said wheel-discs; the pressure of said elastic fluid within said tubular ring normally holding said actuating disc concentric to said wheel hub and out of engagement with said revolvable roller sleeve and lever-arm of said circuit-closing device; but said disc movable, upon the application of a predetermined force to its periphery, to a position eccentric to said wheel hub and into actuating engagement with said roller sleeve and lever arm of said circuit-closing device.

4. The structure embodying an electric circuit-closing device of the class described, and an actuating mechanism in co-acting and operative relation therewith; said circuit-closing device consisting substantially of a vertical standard having a supporting clamp at its bottom engaging with a vehicle axle, and at its top a horizontal extension provided with a fulcrum and a lever-arm pivotally mounted thereon and movable in a vertical plane, said lever-arm having a revolvable roller sleeve on one end and at its other end a flexible contact strip forming a part of an electric circuit; said circuit closing device consisting furthermore of an adjustable contact screw having means for its connection into said electric circuit, said screw mounted on and electrically insulated from said standard, said flexible contact strip normally held out of engagement with said contact screw, but adapted to engagement therewith; and said actuating mechanism consisting substantially of a circular, revolvable, road-surface contacting element comprising a rigid actuating disc having an opening passing centrally through it from side to side, a rigid, circular rim of curved cross-section disposed in said opening and engaging with the surrounding edge thereof, and a circular, hollow, tubular, flexible, elastic ring inflated with an elastic fluid, and disposed inwardly concentric to said rim and in engagement therewith; said actuating mechanism disposed between dual pneumatic tires, tire-rims and wheel-discs of a dual vehicle-wheel mounted upon said vehicle axle and revolving with said wheel; and furthermore disposed in surrounding, concentric, flexible, elastic relation with the hub of said wheel, the said tubular ring engaging therewith, and with the inner surfaces of said wheel-discs; the pressure of said elastic fluid within said tubular ring normally holding said actuating disc concentric to said wheel hub and out of engagement with said revolvable roller sleeve and lever-arm of said circuit-closing device; but said disc movable, upon the application of a predetermined force to its periphery, to a position eccentric to said wheel hub and into actuating engagement with said roller sleeve and lever-arm of said circuit-closing device.

CHARLES BYRON SMITH.
CORWIN SATTERTHWAITE HARVEY.